United States Patent
Sic et al.

(10) Patent No.: US 10,267,070 B2
(45) Date of Patent: Apr. 23, 2019

(54) GLOVE BOX ASSEMBLY WITH EXTERNAL LATCH MECHANISM

(71) Applicant: FORD GLOBAL TECHNOLOGIES, LLC, Dearborn, MI (US)

(72) Inventors: Steven Sic, Troy, MI (US); Adrian Romero Regalado, Cuautitlan Izcalli (MX)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/684,400

(22) Filed: Aug. 23, 2017

(65) Prior Publication Data

US 2019/0063119 A1 Feb. 28, 2019

(51) Int. Cl.
| | |
|---|---|
| *E05B 83/30* | (2014.01) |
| *E05B 81/08* | (2014.01) |
| *E05C 9/22* | (2006.01) |
| *E05C 9/04* | (2006.01) |
| *B60R 7/06* | (2006.01) |

(52) U.S. Cl.
CPC .............. *E05B 83/30* (2013.01); *E05B 81/08* (2013.01); *E05C 9/04* (2013.01); *E05C 9/22* (2013.01); *B60R 7/06* (2013.01)

(58) Field of Classification Search
CPC . E05B 83/30; E05C 9/04; E05C 9/042; B60R 7/06
USPC ...................................................... 296/37.12
See application file for complete search history.

(56) References Cited

U.S. PATENT DOCUMENTS

| | | | | |
|---|---|---|---|---|
| 2,729,089 | A * | 1/1956 | Pelcin ................. | E05B 47/0002 292/36 |
| 5,558,385 | A | 9/1996 | Gross et al. | |
| 6,050,628 | A | 4/2000 | Allison et al. | |
| 7,216,913 | B1 | 5/2007 | Volsey, II | |
| 7,878,035 | B2 * | 2/2011 | Yamaguchi .............. | B60R 7/06 200/43.11 |
| 2016/0002954 | A1 * | 1/2016 | Ali .......................... | E05B 63/18 292/336.3 |

(Continued)

FOREIGN PATENT DOCUMENTS

| | | |
|---|---|---|
| CN | 203358472 U | 12/2013 |
| CN | 205243219 U | 5/2018 |
| JP | 09226465 A | 9/1997 |

(Continued)

OTHER PUBLICATIONS

English Machine Translation of CN203358472U.

(Continued)

*Primary Examiner* — Dennis H Pedder
(74) *Attorney, Agent, or Firm* — Vichit Chea; King & Schickli, PLLC

(57) ABSTRACT

A glove box assembly includes a door, a lock mechanism and a lock release mechanism. The lock mechanism includes a first striker and a second striker carried on the door. The lock mechanism also includes a first latch rod, a second latch rod and a biasing element for biasing the first latch rod and the second latch rod into engagement with the first striker and the second striker. The first latch rod, the second latch rod and the biasing element are located external to the door in order to reduce the size of the door and thereby increase the storage volume of the glove box assembly.

17 Claims, 4 Drawing Sheets

(56) References Cited

U.S. PATENT DOCUMENTS

2018/0155962 A1* 6/2018 Mitchell et al. .... E05B 63/0065

FOREIGN PATENT DOCUMENTS

JP 2007090929 A 4/2007
WO WO-2016185973 A1 * 11/2016 ............. E05B 47/00

OTHER PUBLICATIONS

English Machine Translation of CN205243219U.
English Machine Translation of JP2007090929A.
English Machine Translation of JPH09226465A.

* cited by examiner

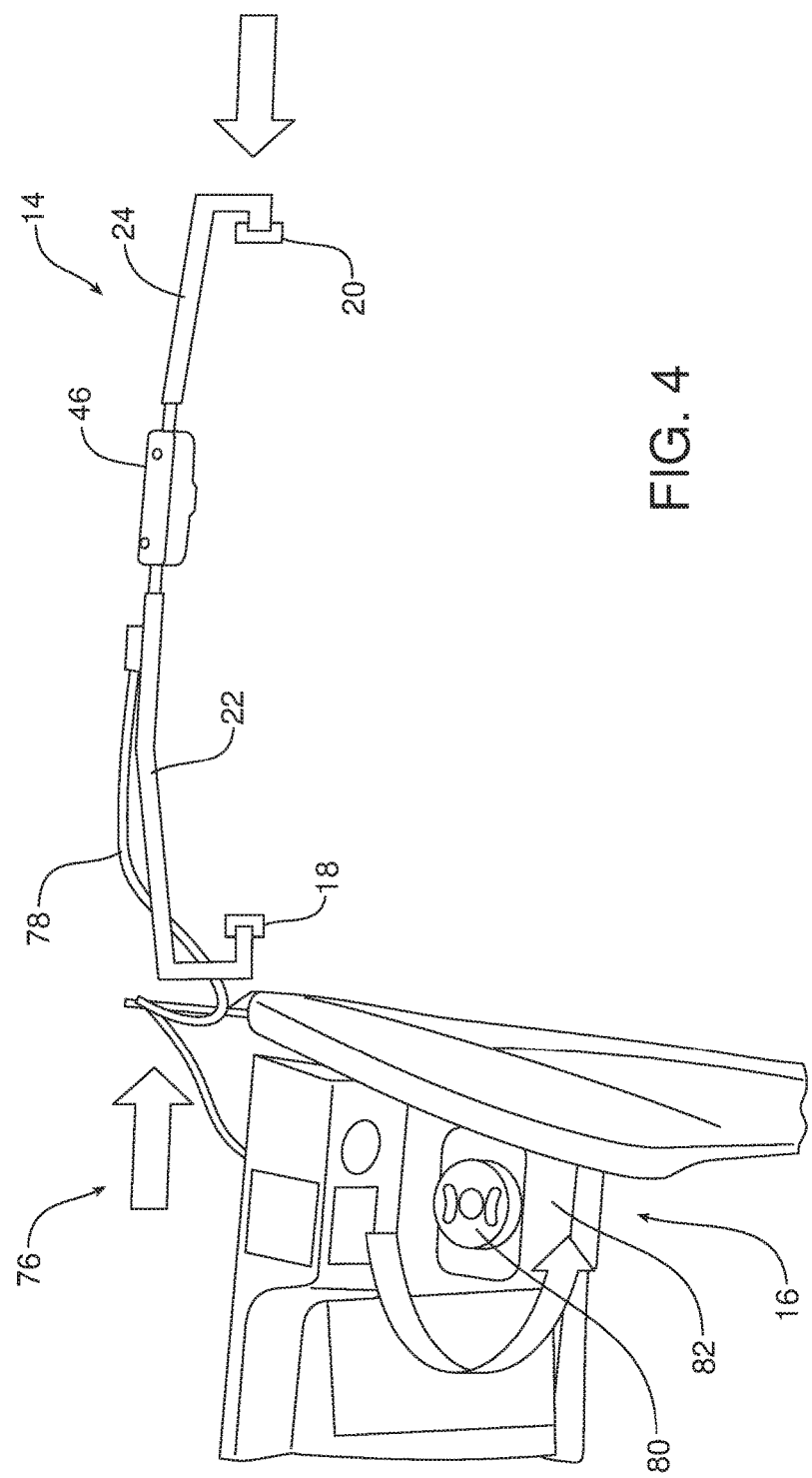

GLOVE BOX ASSEMBLY WITH EXTERNAL LATCH MECHANISM

TECHNICAL FIELD

This document relates generally to the motor vehicle equipment field and, more particularly, to a new and improved glove box assembly incorporating an external locking mechanism that allows an increase in the storage volume of the glove box assembly.

BACKGROUND

State of the art glove box assemblies generally include a door inner panel, a door outer panel and a latch assembly and latch rods packaged between the door inner panel and door outer panel. Significantly, the internal packaging of the latch assembly carried on the door substantially reduces the storage volume of the glove box.

This document relates to a new and improved glove box assembly incorporating an external latch mechanism so as to increase the storage volume of the glove box.

SUMMARY

In accordance with the purposes and benefits described herein, a new and improved glove box assembly is provided. That glove box assembly comprises a door, a lock mechanism and a lock release mechanism. The lock mechanism includes a first striker and a second striker carried on the door, a first latch rod, a second latch rod and a biasing element biasing the first latch rod and the second latch rod into engagement with the first striker and the second striker. The first latch rod, the second latch rod and the biasing element are all packaged exterior to the door and the storage compartment of the glove box assembly. This allows for an increase in storage capacity in a glove box assembly of given size.

The lock release mechanism may include an electronic actuator to unlock the lock mechanism and release the door for opening. That electronic actuator may include a solenoid and an activation switch.

In other possible embodiments, the activation switch is carried on a key fob.

In still other possible embodiments, the lock release mechanism includes a mechanical actuator. That mechanical actuator may comprise a cable and a twist knob.

In any of the possible embodiments, the first latch rod may include a first proximal end and a first distal end and the second latch rod may include a second proximal end a second distal end. Further, the first latch rod and the second latch rod may be displaceable between (a) a locked position wherein the first distal end engages the first striker and the second distal end engages the second striker and (b) an unlocked position wherein the first distal end and the second distal end are free from the first striker and the second striker.

In some of the many possible embodiments the first distal end of the first latch rod may be pivotally connected to a first lug of a first gear. Further, the second distal end of the second latch rod may be pivotally connected to a second lug of a second gear.

The first gear may rotate about a first stub shaft while the second gear may rotate about a second stub shaft carried on a lock mechanism housing. The biasing element may comprise a return spring. The return spring may be connected to the first gear and the second gear. The return spring may also extend concentrically around the first stub shaft and the second stub shaft.

The biasing element biases the first proximal end toward the second proximal end and, therefore, the first distal end and the second distal end into engagement with the first striker and the second striker carried on the door. Thus, the biasing element biases the lock mechanism toward a locked position.

In some possible embodiments the housing of the lock mechanism has a first guideway and a second guideway. The first proximal end includes a first follower sliding along the first guideway and the second proximal end includes a second follower sliding along the second guideway.

In the following description, there are shown and described several preferred embodiments of the glove box assembly. As it should be realized, the glove box assembly is capable of other, different embodiments and its several details are capable of modification in various, obvious aspects all without departing from the glove box assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the glove box assembly and together with the description serve to explain certain principles thereof. In the drawing figures:

FIG. 4 is a schematic illustration of an alternative embodiment wherein the lock mechanism includes a mechanical actuator comprising a cable and a twist knob wherein the twist knob is located remote from the lock mechanism housing.

Reference will now be made in detail to the present preferred embodiments of the glove box assembly, examples of which are illustrated in the accompanying drawing figures.

DETAILED DESCRIPTION

Figure 1:
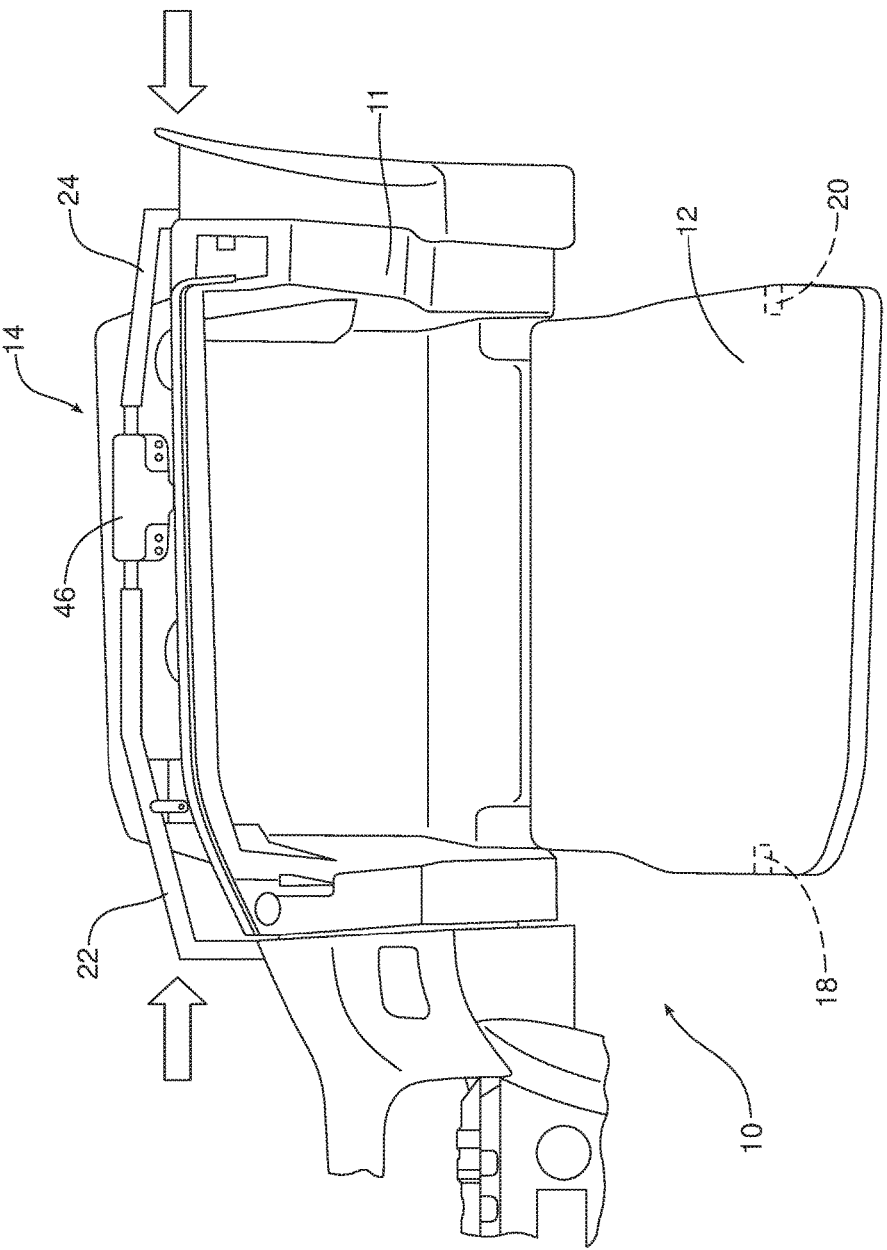
FIG. 1 is a schematic elevational view of the glove box assembly illustrating the lock mechanism including the first latch rod, the second latch rod, the housing and the biasing element packaged exterior to the door of the glove box assembly.

Reference is now made to the drawing figures which illustrate a new and improved glove box assembly 10. As best illustrated in FIG. 1, the glove box assembly 10 includes a housing 11, a door 12, a lock mechanism, generally designated by reference numeral 14 and a lock release mechanism generally designated by reference numeral 16. The lock mechanism 14 includes a first striker 18 and a second striker 20 carried on the door 12. In the illustrated embodiment the first striker 18 and the second striker 20 incorporate opposed openings at opposite sides of the door 12.

The lock mechanism 14 also includes a first latch rod 22, a second latch rod 24 and a biasing element 26 for biasing the first latch rod and the second latch rod into engagement with the first striker 18 and the second striker 20 so as to secure the door 12 in a closed position.

Figure 2:
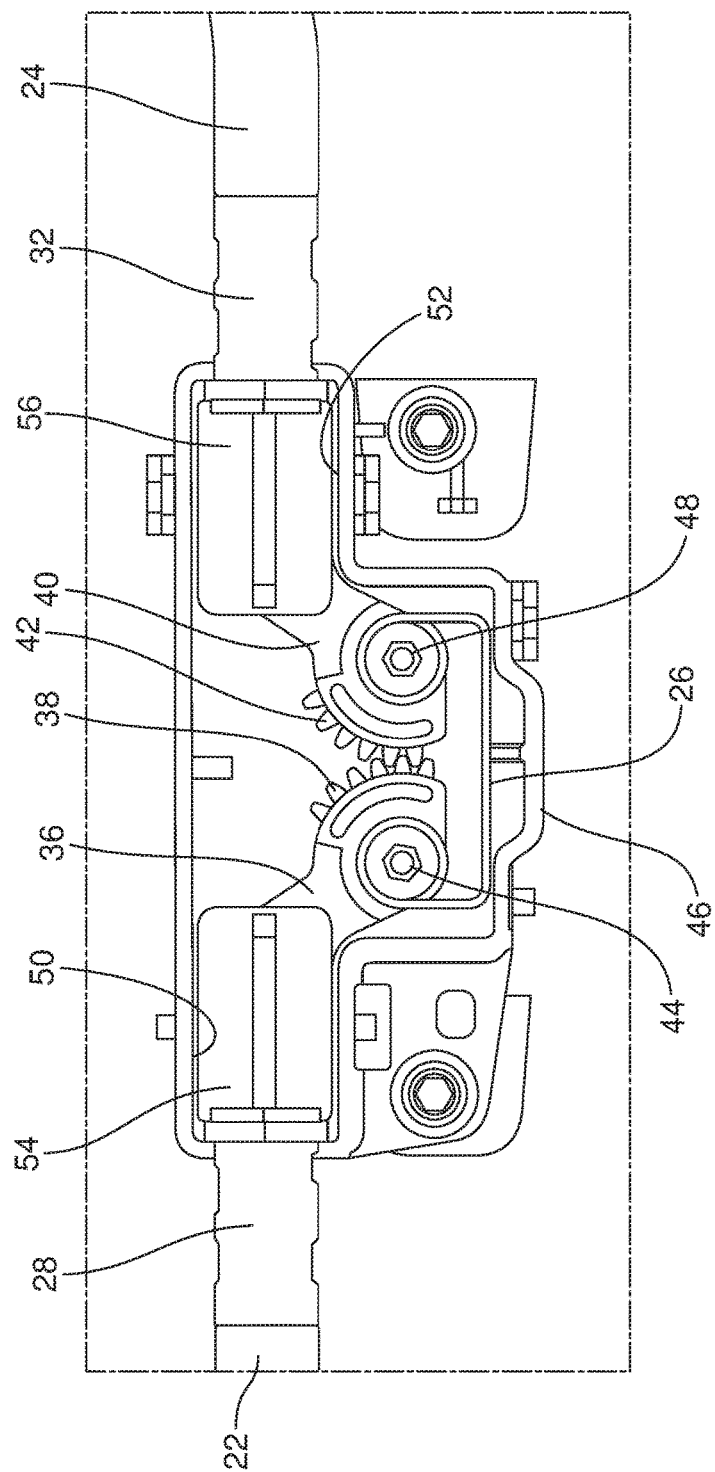
FIG. 2 is a detailed elevational view of the first and second gears in the housing lock mechanism.

More specifically, as best illustrated in FIGS. 1 and 2, the first latch rod 22 includes a first proximal end 28 and a first distal end 30. Similarly, the second latch rod 24 includes a second proximal end 32 and a second distal end 34.

The first proximal end 28 is pivotally connected to a first lug 36 of a first gear 38. The second proximal end 32 is pivotally connected to a second lug 40 of a second gear 42. The first gear 38 rotates about a first stub shaft 44 carried on the lock mechanism housing 46. The second gear 42 rotates about a second stub shaft 48 also carried on the housing 46. In the illustrated embodiment, the two stub shafts 44, 48 are formed as an integral part of the lock mechanism housing 46.

In the illustrated embodiment, the biasing element 26 may take the form of a return spring connected to the first gear 38 and the second gear 42. The return spring/biasing element 26 also extends concentrically around the first stub shaft 44 and the second stub shaft 48 of the lock mechanism housing 46.

The biasing element 26 biases the first proximal end 28 of the first latch rod 22 toward the second proximal end 32 of the second latch rod 24. Thus, the biasing element 26 also functions to bias the first distal end 30 of the first latch rod toward the second distal end 34 of the second latch rod 24 as well as the first distal end into engagement with the first striker 18 on the door 12 and the second distal end into engagement with the second striker 20 on the door 12.

In order to ensure smooth sliding action of the first latch rod 22 and the second latch rod 24, the housing 46 includes a first guideway 50 and a second opposed guideway 52. In addition, the first proximal end 28 of the first latch rod 22 includes a first, low friction follower 54 configured to slide along the first guideway. The second proximal end 32 of the second latch rod 24 includes a similar second low friction follower 56 for sliding smoothly along the second guideway 52.

Figure 3:
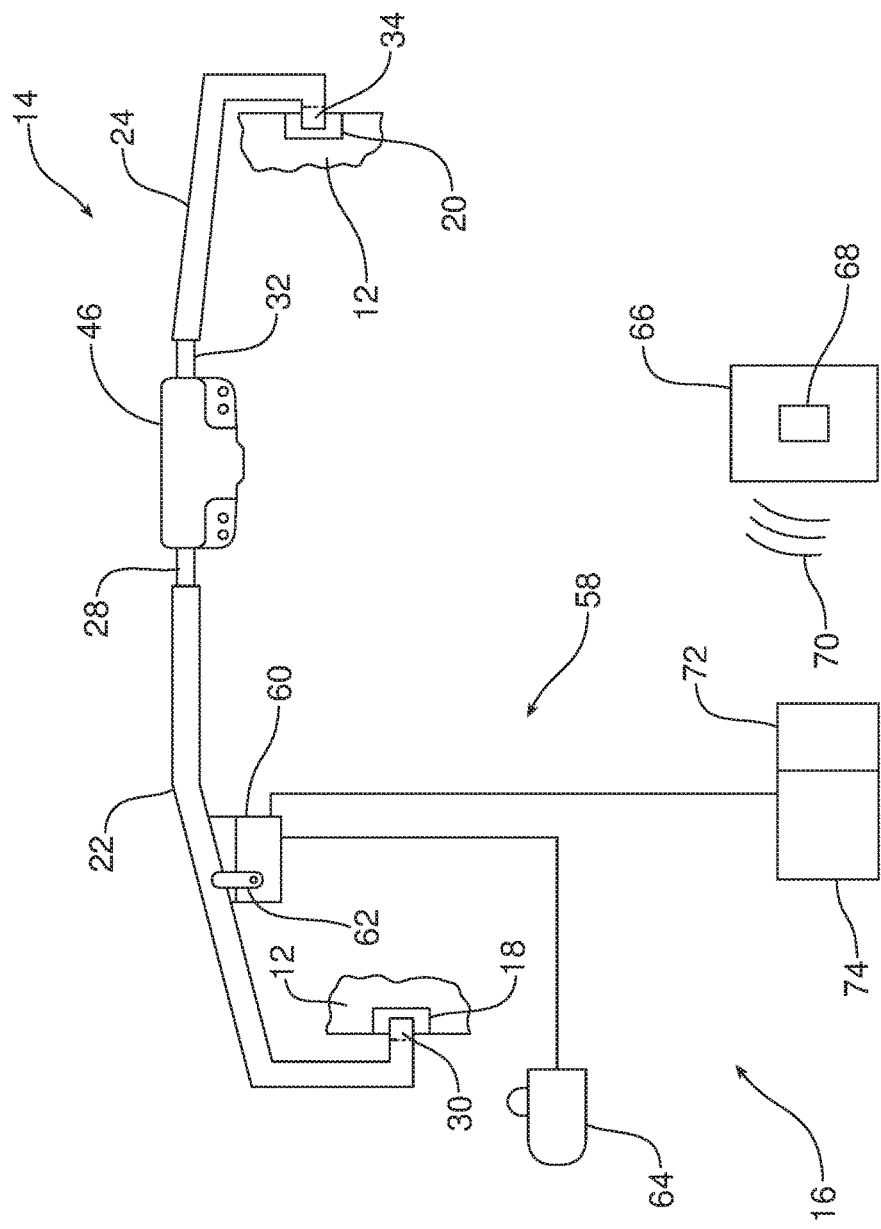
FIG. 3 is a schematic representation of a first possible embodiment of the lock mechanism incorporating an electronic actuator, comprising a solenoid and an activation switch, to unlock the lock mechanism and release the door.

As should be apparent, the first latch rod 22 and the second latch rod 24 are displaceable between (a) a locked position wherein the first distal end 30 of the first latch rod engages the first striker 18 and the second distal end 34 of the second latch rod engages the second striker 20 (see full line position in FIG. 3) and an unlocked position wherein the first distal end and the second distal end are free from the first striker and the second striker to allow the opening of the door 12 of the glove box assembly 10 (see phantom line position in FIG. 3).

The lock release mechanism 16 for releasing or unlocking the lock mechanism 14 and opening the door 12 may be configured in a number of ways. In the embodiment illustrated in FIG. 3, the lock release mechanism 16 includes an electronic actuator 58 to unlock the lock mechanism 14 and release the door 12 for opening. That electronic actuator 58 comprises a solenoid 60 having an arm 62 pivotally connected to the first latch rod 22 and an activation switch 64. As further illustrated in FIG. 3, a key fob 66 matched to the motor vehicle in which the glove box assembly 10 is secured may include an activation switch or button 68 to operate the solenoid 60 via a wireless communication network thereby allowing one to activate the lock release mechanism 16 and unlock the lock mechanism 14 for the opening of the door 12. More specifically, the wireless release signal 70 from the key fob 66 may be received by a transceiver 72 of an electronic control unit 74 connected to the solenoid 60. Such an electronic control unit 74 may comprise, for example, a body control module or BCM.

In the embodiment illustrated in FIG. 4, the lock release mechanism 16 comprises a mechanical actuator 76. In the illustrated embodiment, the mechanical actuator 76 comprises a cable 78 connected to a twist knob 80. As illustrated in FIG. 4, the twist knob 80 may be located remote from the glove box and the housing 46 of the lock mechanism 14 such as on a trim panel 82 of a center console or center stack of an instrument panel.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A glove box assembly, comprising:
a door;
a lock mechanism including a first striker and a second striker carried on said door, a first latch rod, a second latch rod and a biasing element biasing said first latch rod and said second latch rod into engagement with said first striker and said second striker; and
a lock release mechanism
wherein (a) said first latch rod includes a first proximal end and a first distal end and said second latch rod includes a second proximal end and a second distal end, (b) said first proximal end is pivotally connected to a first lug of a first gear and (c) said second proximal end is pivotally connected to a second lug of a second gear.

2. The glove box assembly of claim 1, wherein said lock release mechanism includes an electronic actuator to unlock said lock mechanism and release said door for opening.

3. The glove box assembly of claim 2, wherein said electronic actuator comprises a solenoid and an activation switch.

4. The glove box assembly of claim 3, wherein said activation switch is carried on a key fob.

5. The glove box assembly of claim 1, wherein said lock release mechanism includes a mechanical actuator.

6. The glove box assembly of claim 5, wherein said mechanical actuator comprises a cable and a twist knob.

7. The glove box assembly of claim 1, wherein said first latch rod and said second latch rod are displaceable between (a) a locked position wherein said first distal end engages said first striker and said second distal end engages said second striker and (b) an unlocked position wherein said first distal end and said second distal end are free from said first striker and said second striker.

8. The glove box assembly of claim 7, wherein said first gear rotates about a first stub shaft and said second gear rotates about a second stub shaft.

9. The glove box assembly of claim 8, wherein said biasing element comprises a return spring connected to said first gear and said second gear.

10. The glove box assembly of claim 9, wherein said lock release mechanism includes an electronic actuator to unlock said lock mechanism and release said door for opening.

11. The glove box assembly of claim 10, wherein said electronic actuator comprises a solenoid and an activation switch.

12. The glove box assembly of claim 11, wherein said activation switch is carried on a key fob.

13. The glove box assembly of claim 9, wherein said lock release mechanism includes a mechanical actuator.

14. The glove box assembly of claim 13, wherein said mechanical actuator comprises a cable and a twist knob.

15. The glove box assembly of claim 9, wherein said biasing element biases said first proximal end toward said second proximal end.

16. The glove box assembly of claim 15, wherein said biasing element biases said first distal end toward said second distal end.

17. The glove box assembly of claim 16, wherein said lock mechanism includes a housing having a first guideway and a second guideway and said first proximal end includes a first follower sliding along said first guideway and said second proximal end includes a second follower sliding along said second guideway.

* * * * *